Aug. 21, 1956 W. F. HORTON ET AL 2,760,149

MAGNETIC AMPLIFIER OVERSPEED TRIP DEVICES

Filed May 17, 1952 2 Sheets-Sheet 1

WITNESSES:
John C. Healy
Leon J. Taza

INVENTORS
William F. Horton and
Hugh J. Tyler
BY
Paul E. Friedemann
ATTORNEY

Aug. 21, 1956 W. F. HORTON ET AL 2,760,149

MAGNETIC AMPLIFIER OVERSPEED TRIP DEVICES

Filed May 17, 1952 2 Sheets-Sheet 2

WITNESSES:
John E. Healy
Leon J. Taza

INVENTORS
William F. Horton and
Hugh J. Tyler
BY
Paul E. Friedemann
ATTORNEY

United States Patent Office 2,760,149 Patented Aug. 21, 1956

2,760,149

MAGNETIC AMPLIFIER OVERSPEED TRIP DEVICES

William F. Horton and Hugh J. Tyler, Pittsburgh, Pa., assignors to Westinghouse Electric Corporation, East Pittsburgh, Pa., a corporation of Pennsylvania Application May 17, 1952, Serial No. 288,513

5 Claims. (Cl. 323—89)

Our invention relates to electric apparatus for the indication of overspeed of a machine and more particularly our invention relates to magnetic amplifier controlled apparatus for indicating and controlling the speed of operation of a machine.

The overspeed trip devices of the prior art having a high degree of accuracy are relatively delicate devices, requiring rather frequent checking and involve considerable maintenance.

One object of our invention is the provision of overspeed apparatus that shall be substantially maintenance free and which require rather infrequent recalibration.

Another object of our invention is the provision of static rugged devices for indicating and controlling the speed of a machine, as for example, a locomotive.

Tachometer generators are standard equipment on a number of applications, an example being the tachometer generator and speed indicators used with rail locomotives.

Another advantage is the very low power requirement of our system of control so that there is substantially no back effect on a tachometer generator when a control effect is taken from the tachometer generator.

The objects stated are merely illustrative. Other objects and advantages will become more apparent from a study of the following specification and the accompanying drawing, in which.

Figure 1:
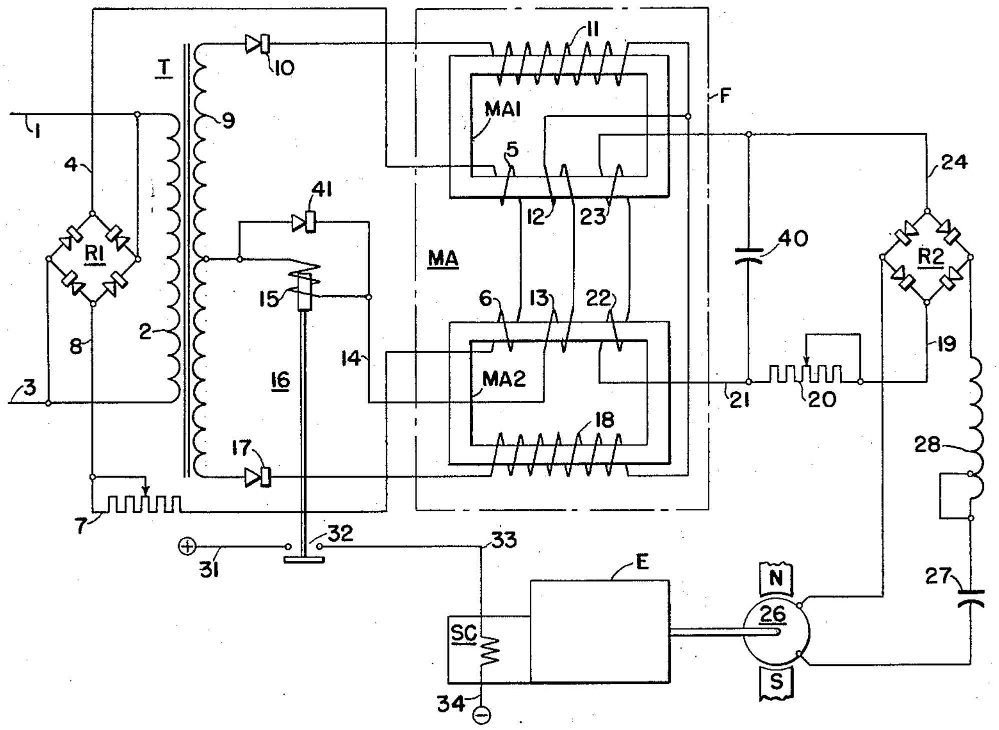
Figure 1 is a circuit diagram illustrating our invention as applied to a locomotive.

According to Fig. 1 alternating current is supplied from terminals, or leads, 1 and 3 to the primary 2 of the transformer T. We utilize a magnetic amplifier MA, usually included in a single frame structure F, including the two parts MA1 and MA2. This magnetic amplifier is provided with a biasing circuit, which receives its energy from the direct current conductors 4 and 8 of the full-wave rectifier R1 connected to the leads 1 and 3 as shown. This biasing circuit may be traced from the positive conductor 4 through the coils 5 and 6 on the core parts of MA1 and MA2, respectively of the magnetic amplifier MA, the bias current adjusting resistor 7 to the negative conductor 8. By adjusting the value of the bias current in coils 5 and 6 the operating characteristics, namely the tripping point, of the magnetic amplifier may be altered at will, as will become more apparent as the description proceeds.

The controlled circuit includes the main windings 11 and 18 and the feed-back windings 12 and 13. This controlled circuit for one half-wave of alternating current may be traced from the upper terminal of the secondary 9 of the transformer T through the rectifier 10, main coil 11, feed-back coils 12 and 13, conductor 14, actuating coil 15 of the controlled relay 16 to the mid-tap on the secondary 9. For the second half-wave the energized controlled circuit may be traced from the lower terminal of the secondary 9 through the rectifier 17, main coil 18, the feed-back coils 12 and 13, conductor 14, and coil 15 of the relay 16 to the mid-tap of the secondary 9.

From the foregoing it will be apparent that the saturation, or feed-back, windings 12 and 13 are connected in series with the output circuit of the magnetic amplifier. Furthermore, these windings, or coils, 12 and 13 are poled to magnetize each reactor core in the direction of self-saturation due to the rectified current that traverses the main coils 11 and 18 of the reactor through the series connected rectifiers 10 and 17. In this manner, the reactors are magnetically overexcited, that is, they have more than 100% feed-back excitation. The coils 5 and 6 normally receive a selected constant excitation from the rectifier R1 through the adjusting resistor 7.

Figure 2:
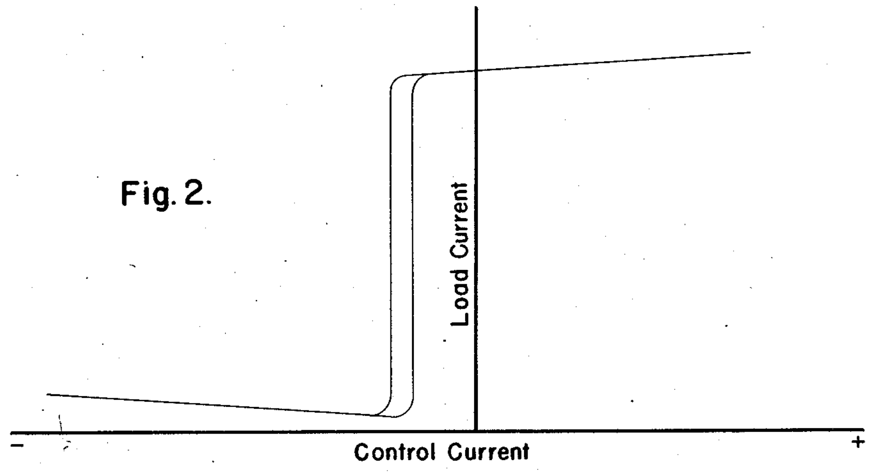
Figs. 2 and 3 show curves illustrating how the operating characteristics of a control may be changed with a change in bias on the magnetic amplifier included in the control.
Figure 3:
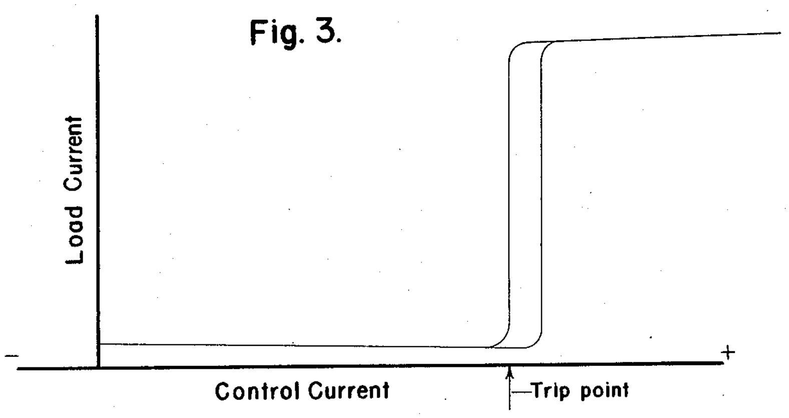

The tripping characteristic of the magnetic amplifier, in the absence of any biasing current in the coils 5 and 6, is designed to be as shown in Fig. 2. To give the control coils more effective control and to make the whole control more effective over a wider range, the biasing coils are poled to act in opposition to the self-saturating effect of coils 11, 12, 13 and 18. The tripping characteristics of the magnetic amplifier is thus changed as indicated in Fig. 3.

Coils 22 and 23 represent the control coils of the magnetic amplifier. These coils are energized from the direct current leads 19 and 24 connected to the full-wave rectifier R2. The circuit may be traced from the positive lead 19 through the gain control resistor 20, conductor 21, control coils 22 and 23 to the negative lead 24.

The alternating current terminals of the rectifier R2 are supplied from the alternating current tachometer 26 through the capacitor 27 and inductance 28. The output of the tachometer varies in magnitude and frequency in direct proportion to the speed of the locomotive or engine E to which it is coupled, and its output circuit includes, as mentioned, the adjustable inductance 28 and the capacitor 27. This output circuit is adjusted to be a series resonant circuit and is thus the key to the accuracy of our control.

Figure 4:
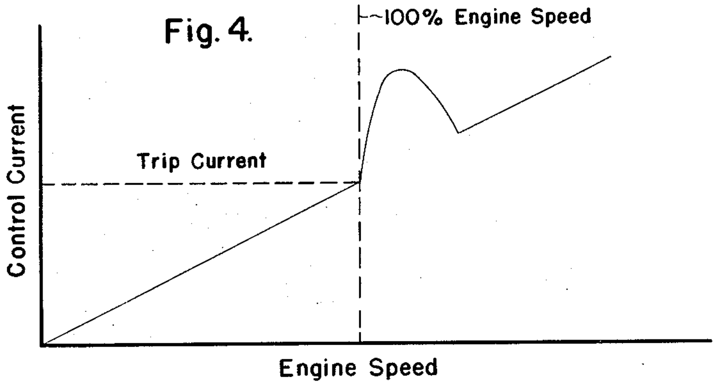
Fig. 4 shows a curve illustrating the variations of control current with changes in speed of the machine the speed of which is to be indicated.

The resonant frequency of this series resonant circuit is adjusted to a frequency slightly above the tachometer frequency corresponding to the trip speed. Fig. 4 shows the change in output current at the coils 22 and 23 of the rectifier R2. It will be noted that the output current rises sharply as the trip speed of the magnetic amplifier is approached and becomes somewhat greater than the trip control current for a relatively small overspeed of the engine E. When the engine speed exceeds, by a relatively small percent, the normal or desired engine speed, the control current moves to the right (see Fig. 3) of the trip characteristic of the magnetic amplifier and in consequence the load current rises rapidly through coil 15 and this relay, or indicating device, as the case may be, is operated. If a control relay is used, a circuit is established from the positive terminal 31 through contacts 32, conductor 33, through the overspeed indicating device, or overspeed control device SC to the negative terminal 34. The speed control device SC either operates a signal or operates directly on the locomotive, or engine, to decrease the speed back to the 100% speed value.

To provide for smooth control function of the control windings 22 and 23, the capacitor 40 is connected directly across the direct current leads 19 and 21.

To prevent reverse current in coil 15 as well as to provide a discharge path for coil 15 the rectifier 41, poled as shown, is connected in parallel to the coil 15. The coil 15 is thus not likely to become deenergized during low voltage transients.

Our overspeed control has been found to be within 2.5% at trip speed, which is as good as some of the better considerably more expensive and more delicate prior art devices. This accuracy of performance coupled with ruggedness and maintenance free character of our control makes our invention a valuable contribution to the art.

While Fig. 1 shows a preferred embodiment, our invention is not limited to the particular amplifier circuits shown. For some applications the simpler circuit shown in Fig. 5 may be used.

Figure 5:
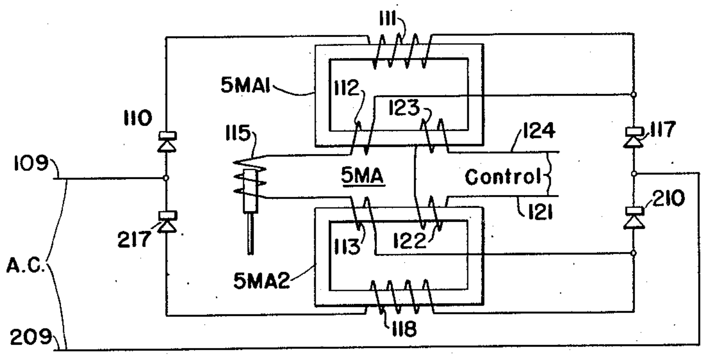
Fig. 5 is a diagrammatic showing of a modification of the magnetic amplifier circuit included in our invention.

In Fig. 5 the alternating current is supplied from the terminals 109 and 209. For the first half-wave the current may be traced from terminal 109 through the rectifier 110, the main coil 111 of the 5MA1 portion of the magnetic amplifier 5MA, the feed-back coil 112, the speed responsive relay coil 115, the feed-back winding 113 on the core of the 5MA2 portion of the magnetic amplifier 5MA, the rectifier 210 to the terminal 209.

For the second half-wave the current comes from terminal 209, through rectifier 117, coils 112, 115, and 113, the main winding 118, rectifier 217 to terminal 109.

The control current is received from terminals 121 and 124 through the coils 122 and 123 on the respective cores of the magnetic amplifier portions 5MA1 and 5MA2.

While we have shown and described but one embodiment of our invention, we are aware that modifications are possible. Our invention, therefore, is not to be restricted beyond the spirit and scope of our invention.

We claim as our invention:

1. In a system of control, in combination, alternating current supply terminals, and magnetic amplifying means including, a reactor core, a main winding on said core supplied with current from said terminals, a half-wave rectifier in the circuit of the main winding for causing the main winding to be energized by pulses of current in the same direction during alternate half cycles of the alternating current, further rectifying means and a direct-current positive feed-back coil on the core and interconnected with said further rectifying means and the main coil to provide a cumulative magnetizing effect in the core proportional to the current in the main coil, a direct-current bias coil on the core acting in opposition to the main coil, a direct-current control coil, a second pair of alternating current supply terminals energized with alternating current of variable frequency, a full-wave rectifier interconnecting the said second pair of alternating current supply terminals with said control coil, means for supplying for a selected relatively narrow range of frequencies a relatively high voltage from the said second pair of alternating current supply terminals to said full-wave rectifier to thus make the magnitude of the energization of the control coil sensitive to said range of frequencies, and an output circuit interconnected with the positive feed-back coil.

2. In a system of control, in combination, alternating current supply terminals, and magnetic amplifying means including, a reactor core, a main winding on said core supplied with current from said terminals, a half-wave rectifier in the circuit for the main winding for causing the main winding to be energized by pulses of current in the same direction during alternate half cycles of the alternating current, further rectifying means and a direct-current positive feed-back coil on the core and interconnected with said further rectifying means and the main coil to provide a cumulative magnetizing effect in the core proportional to the current in the main coil, a direct-current bias coil on the core acting in opposition to the main coil, a direct-current control coil, a second pair of alternating current supply terminals energized with alternating current of variable frequency, a full-wave rectifier interconnecting the said second pair of alternating current supply terminals with said control coil, means comprising a series resonant circuit for supplying for a selected relatively narrow range of frequencies a relatively high voltage from the said second pair of alternating current supply terminals to said full-wave rectifier to thus make the magnitude of the energization of the control coil sensitive to said range of frequencies, and an output circuit interconnected with the positive feed-back coil.

3. In a system of control, in combination, alternating current supply terminals, and magnetic amplifying means including, a reactor core, a main winding on said core supplied with current from said terminals, a half-wave rectifier in the circuit of the main winding for causing the main winding to be energized by pulses of current in the same direction during alternate half cycles of the alternating current, further rectifying means and a direct-current positive feed-back coil on the core and interconnected with said further rectifying means and the main coil to provide a cumulative magnetizing effect in the core proportional to the current in the main coil, a direct-current bias coil on the core acting in opposition to the main coil, a direct-current control coil, a second pair of alternating current supply terminals energized with alternating current of variable frequency, a full-wave rectifier interconnecting the said second pair of alternating current supply terminals with said control coil, means comprising a series resonant circuit including a resistor and capacitor connected in series with the full-wave rectifier, for supplying for a selected relatively narrow range of frequencies a relatively high voltage from the said second pair of alternating current supply terminals to said full-wave rectifier to thus make the magnitude of the energization of the control coil sensitive to said range of frequencies, and an output circuit interconnected with the positive feed-back coil.

4. In a system of control for controlling the output of a magnetic amplifier, in combination, alternating current supply terminals, a magnetic amplifier including magnetic circuit means, a main coil for magnetizing the magnetic circuit means, a half-wave rectifier connected in series with the main coil, both the main coil and the rectifying means being connected to said terminals to thus effect energization of said main coil with pulses of unidirectional current during alternate half cycles of alternating current supplied to said main coils from said terminals, an output circuit interconnected with said main coil, said output circuit including a load unit and a positive feed-back coil, said feed-back coil being wound for cumulatively magnetizing said magnetic circuit means with a direct current proportional to the current supplied to the load unit, a bias coil energized with direct current of a selected value, a second pair of alternating current supply terminals energized with alternating current having a variable frequency, control circuit means comprising a series resonant circuit including a resistor and a capacitor adapted to produce an output current that evidences a relatively sharp rise for a given relatively narrow range of frequencies of the alternating current energizing the second pair of supply terminals, a control rectifier having its alternating current terminals connected to the control circuit means, a control coil connected to the direct current output terminals of the control rectifier, said control coil being wound on said magnetic circuit means to produce an effect in the same sense as the effect produced by the feed-back coil.

5. In a system of control for controlling the output of a magnetic amplifier, in combination, alternating current supply terminals, a magnetic amplifier including magnetic circuit means, a main coil for magnetizing the magnetic circuit means, a half-wave rectifier connected in series with the main coil, both the main coil and the rectifying means being connected to said terminals to thus effect energization of said main coil with pulses of unidirectional current during alternate half cycles of alternating current supplied to said main coils from said terminals, an output circuit interconnected with said main coil, said output circuit including a load unit and a positive feed-back coil, said feed-back coil being wound for cumulatively magnetizing said magnetic circuit means with a direct current proportional to the current supplied to the load unit, a bias coil energized with direct current of a selected value, said coil being wound on the magnetic circuit means to act in a sense opposite to the magnetic effect of the feed-back coil to thus shift the saturation point with reference to the output current, a second pair of alternating current supply terminals energized with alternating current having a variable frequency, control circuit means comprising a series resonant circuit adapted to produce an output current that evidences a relatively sharp rise for a given relatively narrow range of frequencies of the alternating current energizing the second pair of supply terminals, a control rectifier having its alternating current terminals connected to the control circuit means, a control coil connected to the direct current output terminals of the control rectifier, said control coil being wound on said magnetic circuit means to produce an effect in the same sense as the effect produced by the feed-back coil.

References Cited in the file of this patent

UNITED STATES PATENTS

| | | |
|---|---|---|
| 2,331,960 | Button | Oct. 19, 1943 |
| 2,512,317 | Edwards et al. | June 20, 1950 |
| 2,559,992 | Ogle | June 5, 1951 |
| 2,594,022 | Horton | Apr. 22, 1952 |
| 2,635,223 | Grillo | Apr. 14, 1953 |